(12) United States Patent
Takano et al.

(10) Patent No.: US 10,001,124 B2
(45) Date of Patent: Jun. 19, 2018

(54) OIL-COOLED GAS COMPRESSOR

(71) Applicant: Hitachi Industrial Equipment Systems Co., Ltd., Chiyoda-ku, Tokyo (JP)

(72) Inventors: Masahiko Takano, Shizuoka (JP); Hideharu Tanaka, Shizuoka (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days. days.

(21) Appl. No.: 15/237,990

(22) Filed: Aug. 16, 2016

(65) Prior Publication Data

US 2016/0356289 A1 Dec. 8, 2016

Related U.S. Application Data

(62) Division of application No. 13/818,841, filed as application No. PCT/JP2011/068084 on Aug. 8, 2011, now Pat. No. 9,441,638.

(30) Foreign Application Priority Data

Aug. 27, 2010 (JP) .................................. 2010-190761

(51) Int. Cl.
*F04C 29/04* (2006.01)
*F25B 31/00* (2006.01)
(Continued)

(52) U.S. Cl.
CPC ............ *F04C 29/04* (2013.01); *F25B 31/004* (2013.01); *F25B 43/02* (2013.01); *F04C 18/16* (2013.01);
(Continued)

(58) Field of Classification Search
CPC ........ F25B 31/004; F25B 43/02; F04B 39/02; F04B 39/0207; F04B 53/08; F04C 29/04
See application file for complete search history.

(56) References Cited

U.S. PATENT DOCUMENTS 3,856,493 A 12/1974 Bulkley
5,348,076 A * 9/1994 Asakawa ........... H05K 7/20281
165/104.33
(Continued)

FOREIGN PATENT DOCUMENTS

JP 61-179387 U 11/1986
JP 64-63690 A 3/1989
(Continued)

OTHER PUBLICATIONS

International Search Report with English translation dated Nov. 8, 2011 (four (4) pages).
(Continued)

*Primary Examiner* — Patrick Hamo
(74) *Attorney, Agent, or Firm* — Crowell & Moring LLP

(57) ABSTRACT

An oil-cooled gas compressor provided with a compressor body, an oil separator that separates out oil from a compressed gas, a gas pipe for sending the compressed gas, from which oil has been separated out by the oil separator, to a user, and an oil pipe for returning, to the compressor, the oil separated out by the oil separator. An air-cooled heat exchanger for cooling the aforementioned oil, a controllable-speed cooling fan for blowing cooling air at said air-cooled heat exchanger, and a waste-heat-recovery heat exchanger, provided upstream of the air-cooled heat exchanger, for recovering heat from the oil flowing through the abovementioned oil pipe, are also provided. The speed of the cooling fan is controlled so as to bring the temperature of the compressed gas discharged from the compressor body to within a prescribed range. It is possible both to recover waste heat from the oil heated by being used to cool the compressor and to suppress compressor temperature fluctuations, even if the load on the waste-heat-recovery equipment varies.

9 Claims, 3 Drawing Sheets

(51) Int. Cl.
  *F25B 43/02* (2006.01)
  *F04C 18/16* (2006.01)
(52) U.S. Cl.
  CPC .... *F04C 2240/81* (2013.01); *F04C 2270/195* (2013.01); *F05B 2260/20* (2013.01); *Y02P 80/152* (2015.11)

(56) References Cited

U.S. PATENT DOCUMENTS

| | | | |
|---|---|---|---|
| 6,250,096 | B1 | 6/2001 | Bonaquist et al. |
| 6,301,923 | B1 | 10/2001 | Bonaquist et al. |
| 8,590,324 | B2 | 11/2013 | Guo et al. |
| 9,441,638 | B2 * | 9/2016 | Takano ............... F04C 29/04 |
| 2007/0140866 | A1 | 6/2007 | Tanaka |
| 2008/0087027 | A1 * | 4/2008 | Park .................... F01C 21/02 62/81 |
| 2009/0087320 | A1 | 4/2009 | Tanaka et al. |
| 2011/0000227 | A1 | 1/2011 | Kamiya |

FOREIGN PATENT DOCUMENTS

| | | |
|---|---|---|
| JP | 6-213188 A | 8/1994 |
| JP | 8-319976 A | 12/1996 |
| JP | 10-159764 A | 6/1998 |
| JP | 2000-45950 A | 2/2000 |
| JP | 2003-254253 A | 9/2003 |
| JP | 2006-316696 A | 11/2006 |
| JP | 4329875 B1 | 9/2009 |
| JP | 2009-243767 A | 10/2009 |

OTHER PUBLICATIONS

Japanese Office Action dated Nov. 18, 2014, with English translation (nine (9) pages).
Russian Office Action dated Dec. 4, 2014, with English translation (five (5) pages).

* cited by examiner

OIL-COOLED GAS COMPRESSOR

CROSS REFERENCE TO RELATED APPLICATIONS

This application is a divisional of and claims priority to U.S. application Ser. No. 13/818,841, filed Feb. 25, 2013, the entire disclosure of which is incorporated herein by reference, which is the U.S. National Phase of International Application No. PCT/JP2011/068084, filed Aug. 8, 2011, the entire disclosure of which is incorporated herein by reference, which in turn claims priority to Japanese Patent Application No. 2010-190761, filed Aug. 27, 2010, the entire disclosure of which is also incorporated by reference herein.

TECHNICAL FIELD OF THE INVENTION

The present invention relates to an oil-cooled gas compressor, and more specifically to capability of recovering waste heat from an oil-cooled air compressor.

BACKGROUND ART

It is said that twenty to twenty-five percentages of energy consumed at an entire plant correspond to total energy consumed by gas compressors such as an air compressor, and it is greatly effective to recover waste heat from the gas compressor. Especially, for the purpose of achieving an object of reducing an amount of $CO_2$ emission starting from global heating, use of the waste-heat from the gas compressor is expected to be further given importance in future.

The gas compressor is composed of: a compressor body compressing gas such as air; a cooling system absorbing heat generated by compression; a motor as a source of drive power; etc. Moreover, in the gas compressor, where motor input power is 100%, the amount of heat absorbed in the cooling system corresponds to 90% or more thereof, this amount of heat is usually released to outside air, and a great deal of energy is discharged to the air. To reduce the amount of waste heat, achievement of higher efficiency of the compressor body and the motor has been promoted, but its effect is several percentages at a maximum, which therefore raises demands for effective use of the waste heat from the gas compressor.

For the effective use of the waste heat from the gas compressor, cases include: use for air heating, warm water use, and use for boiler feed-water preheat, which are still under study.

Described as this type of conventional art is, for example, Japanese Patent No. 4329875 (Patent Document 1). In this Patent Document 1, a compressor is driven by using vapor, and heat generated at the compressor is used for preheat of water (feed-water) supplied to a boiler, thereby reducing energy consumed at the boiler.

CONVENTIONAL ART DOCUMENTS

Patent Documents

Patent Document 1: Japanese Patent No. 4329875

SUMMARY OF THE INVENTION

Problem to Solved by the Invention

In Patent Document 1 described above, the heat generated at the air compressor is used as the boiler feed-water preheat, as the cooling system of the air compressor, one water cooling system is included, the heat generated by air compression is absorbed by water of the water cooling system, and this heated water is mixed with the water supplied to the boiler to thereby raise temperature of the water supplied to the boiler and reduce the energy consumed at the boiler.

In this invention, control needs to be made in view of the amount of the heat generated at the air compressor and load used at the boiler, raising a problem that this control is difficult. Moreover, the cooling system of the air compressor is applicable for water cooling only, and the invention described in Patent Document 1 is not applicable in a case where the cooling system is an air-cooling air compressor, in which case there arises a problem that heat discharged from the air compressor cannot effectively be used.

Moreover, as a conventional oil-cooled gas compressor, there is the one which heats water via a waste-heat-recovery heat exchanger from oil (lubricating oil) heated by being used to cool the compressor or compressed gas discharged from the compressor and then recovers waste heat, but load on a waste-heat-recovery equipment easily varies and temperature of the oil and the compressed gas exiting from the waste-heat-recovery heat exchanger fluctuates. Moreover, depending on a status of use at a compressed gas user, a flow rate of the compressed gas greatly fluctuates, whereby the temperature of the oil and the compressed air exiting from the waste-heat-recovery heat exchanger fluctuates. Thus, temperature of the oil returned to the compressor for compressor cooling fluctuates, so that temperature of compressor fluctuations and temperature fluctuation of the compressed gas supplied to the user also increase. Therefore, it has been difficult to ensure reliability of the compressor and supply compressed gas at stable temperature. Further, in a case where load of use of the oil-cooled gas compressor and that of the waste-heat-recovery equipment recovering waste heat of the gas compressor for effective use do not agree with each other, the gas compressor is stopped by a protection equipment.

It is an object of the present invention to provide an oil-cooled gas compressor capable of recovering waste heat from oil (lubricant) heated by being used to cool an compressor and also capable of suppressing compressor temperature fluctuations by controlling the temperature of the oil returned to the compressor for compressor cooling even if the load on a waste-heat-recovering equipment varies.

Means for Solving Problem

The present invention solving the problem described above refers to an oil-cooled gas compressor including: a compressor body; an oil separator separating out oil from compressed gas discharged from the compressor body; a gas pipe for sending, to a user, the compressed gas separated from the oil by the oil separator; and an oil pipe for returning, to the compressor, the oil separated by the oil separator. The oil-cooled gas compressor further includes: an air-cooled heat exchanger for cooling the oil flowing through the oil pipe; a cooling fan being capable of controlling rotational frequency for sending cooling wind to the air-cooled heat exchanger; and a waste-heat-recovery heat exchanger, being provided upstream of the air-cooled heat exchanger, for recovering heat from the oil flowing through the oil pipe, wherein the rotational frequency of the cooling fan is controlled in a manner such that temperature of the compressed gas discharged from the compressor body falls within a prescribed range.

In the above, a discharge temperature sensor detecting temperature of the compressed gas discharged from the compressor body may be provided, and the rotational frequency of the cooling fan may be controlled in accordance with the temperature detected by the discharge temperature sensor.

Moreover, it is preferable that the air-cooled heat exchanger also cool compressed gas flowing through the gas pipe and that the waste-heat-recovery heat exchanger also recover heat from the compressed gas flowing through the gas pipe, and the air-cooled heat exchanger and the waste-heat-recovery heat exchanger may be serially connected to the oil pipe or the gas pipe.

Further, it is preferable that a temperature sensor detecting temperature of the compressed gas exiting from the waste-heat-recovery heat exchanger and a temperature sensor detecting temperature of the oil exiting from the waste-heat-recovery heat exchanger be provided, and that the rotational frequency of the cooling fan be controlled in accordance with the temperature of the compressed gas and the oil detected by the temperature sensors and the compressor discharge temperature detected by the discharge temperature sensor.

The compressor body, the oil separator, and the air-cooled heat exchanger may be stored in one housing to form a compressor unit, the waste-heat-recovery heat exchanger may be stored in another housing to form a waste-heat-recovery unit, and the compressor unit and the waste-heat recovery unit are connected together with pipes. Moreover, it is preferable that the oil-cooled gas compressor be an oil-cooled screw air compressor.

It is preferable to provide: an oil bypass pipe for flowing the oil exiting from the oil separator directly to the air-cooled heat exchanger without flowing the oil to the waste-heat-recovery heat exchanger; and an oil change-over valve changing over the oil from the oil separator between flow to the waste-heat-recovery heat exchanger and flow to the oil bypass pipe. Moreover, it is further preferable to provide: a gas bypass pipe for flowing the compressed gas exiting from the oil separator directly to the air-cooled heat exchanger without flowing the compressed gas to the waste-heat-recovery heat exchanger; and an oil change-over valve changing over the compressed gas from the oil separator between flow to the waste-heat-recovery heat exchanger and flow to the gas bypass pipe.

The waste-heat-recovery heat exchanger is connected to a circulation pipe for guiding fluid from an external waste-heat-recovery equipment and returning the fluid subjected to heat exchange to the waste-heat-recovery equipment, and the circulation pipe includes a running water detecting sensor, which makes it possible to control the oil change-over valve based on running water information detected by the running water detecting sensor. Moreover, the circulation pipe is includes a temperature sensor, which makes it possible to control the oil change-over valve based on temperature information from the temperature sensor.

A plurality of the waste-heat-recovery equipment can be parallelly connected to the circulation pipe, and can be selectively connected based on the temperature information from the temperature sensor.

Effects of the Invention

According to the present invention, it is possible to recover waste heat from oil heated by being used to cool the compressor, and also to quickly vary the temperature of the oil returned to the compressor for compressor cooling by controlling rotation speed of the cooling fan even if the load on the waste-heat-recovery equipment varies, which therefore makes it possible to control the temperature of the compressed gas discharged from the compressor to within a prescribed range. This consequently can provide an oil-cooled gas compressor capable of suppressing compressor temperature fluctuations.

MODES FOR CARRYING OUT THE INVENTION

Hereinafter, embodiments of an oil-cooled gas compressor of the present invention will be described with reference to the accompanying drawings.

First Embodiment

Figure 1:
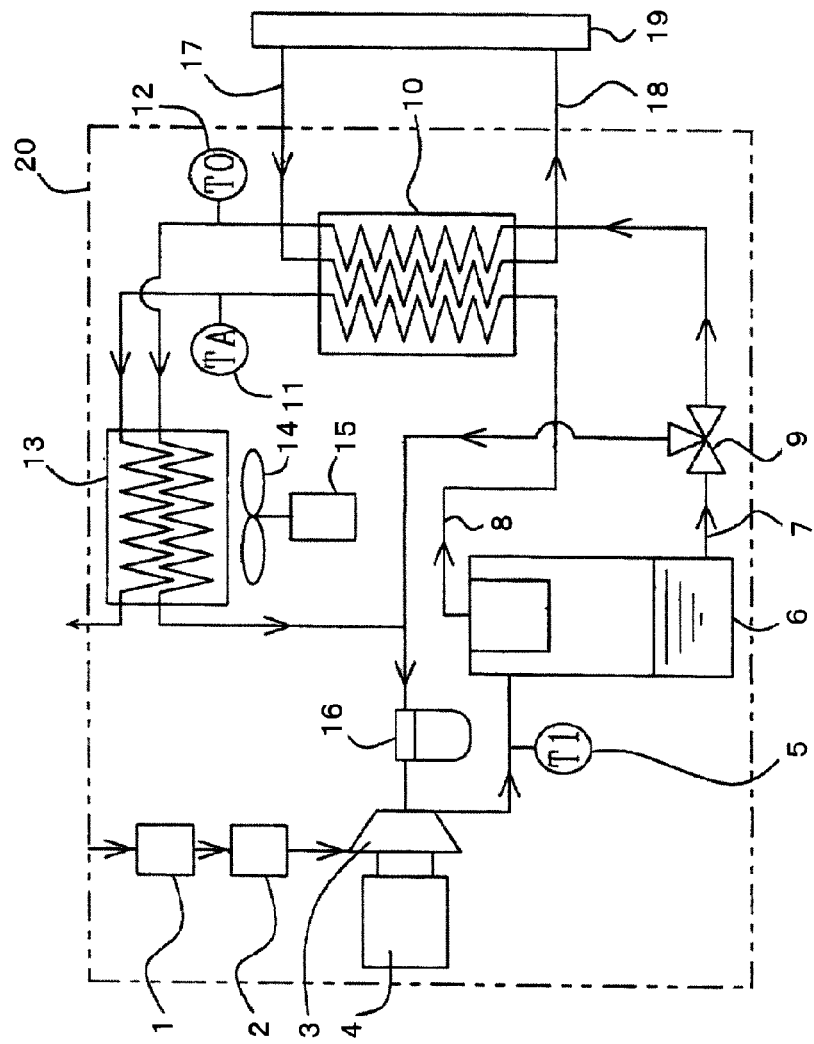
FIG. 1 is a schismatic diagram showing a first embodiment of an oil-cooled gas compressor of the present invention.

FIG. 1 is a schismatic diagram illustrating the first embodiment of the oil-cooled gas compressor of the invention. In this drawing, numeral 3 denotes a compressor body and is composed of an oil-cooled screw air compressor in this embodiment. The compressor body 3 is driven by a motor 4, upon which air (gas) suctioned into a compressor unit 20 is absorbed into the compressor body 3 via a suction filter 1 and a suction throttle valve 2, is then compressed and discharged, and then flows into an oil separator (oil tank) 6. Oil accumulating at the bottom of the oil separator 6 is introduced via an oil pipe 7, a temperature regulating valve 9, and an oil filter 16 into a compression chamber under compression in the compressor body 3, and cooling of compressed air is performed. Moreover, the compressed air and the introduced oil are discharged from a discharge port of the compressor body 3 while they are mixed together. After temperature of the compressed air containing this oil is detected by a discharge temperature sensor (compressor body outlet temperature sensor) (T1) 5, this compressed air enters into the oil separator 6, and the oil is subjected to centrifugal separation from the compressed air and accumulates at the bottom of the oil separator 6.

On the other hand, the compressed air separated from the oil flows out from a gas pipe (air pipe) 8 above the oil separator 6 and flows into a waste-heat-recovery heat exchanger 10 composed of a water-cooled heat exchanger. The oil accumulating at the bottom of the oil separator 6 is adapted to flow out from the oil pipe 7 and be flown by the temperature regulating valve 9 towards the waste-heat-recovery heat exchanger 10 when oil temperature is high and directly towards the oil filter 16 when the oil temperature is low.

The waste-heat-recovery heat exchanger 10 is connected to a waste-heat-recovery equipment 19. When this waste-heat-recovery equipment 19 is in operation, the waste-heat-recovery equipment 19 circulates its cooling water (fluid) via circulation pipes (cooling water inlet pipe 17 and cooling water outlet pipe 18) through the waste-heat-recovery heat exchanger 10, and flows therein the cooling water from the cooling water inlet pipe 17 of the waste-heat-recovery heat exchanger 10 and collects warm water from the cooling water outlet pipe 18 to thereby collect an amount of compressed heat generated at the compressor body 3. That is, in the waste-heat-recovery heat exchanger 10, the high-temperature oil flowing through the oil pipe 7 and the high-temperature compressed air flowing through the gas pipe 8 are heat-exchanged with the cooling water from the waste-heat-recovery equipment 19, whereby the cooling water is heated and the compressed air and the oil are cooled.

Temperature of the compressed air exiting from the waste-heat-recovery heat exchanger 10 is detected by a temperature sensor (TA) 11 and the compressed air flows to the air-cooled heat exchanger 13, and temperature of the oil is similarly detected by a temperature sensor (TO) 12 and the oil flows to the air-cooled heat exchanger 13. In this air-cooled heat exchanger 13, in order to achieve small temperature difference between the discharge temperature of the compressed air from the compressor body outlet, which temperature is detected by the discharge temperature sensor 5, and preset target discharge temperature, in view of the temperature of the compressed air and the oil detected by the temperature sensors 11 and 12, a fan motor 15 is subjected to inverter control. As a result, rotation speed of a cooling fan 14 is changed to cool, at appropriate temperature, the oil introduced into the compressor, and this cooled oil is introduced into the compressor body 3 via the oil filter 16. The compressed air further cooled at the air-cooled heat exchanger 13 is supplied as compressed air to outside of a compressor unit 20.

The control of changing rotation speed of the cooling fan 14 through the inverter control of the fan motor 15 will be described in more detail. The rotation speed of the cooling fan 14 is controlled so that an amount of heat exchange at the air-cooled heat exchanger 13 increases when the amount of heat exchange at the waste-heat-recovery heat exchanger 10 is small (when the amount of waste heat recovery at the waste-heat-recovery equipment 19 is small) and the amount of heat exchange at the air-cooled heat exchanger 13 decreases when the amount of heat exchange at the waste-heat-recovery heat exchanger 10 is large. Respective permitted amounts of heat exchange at the waste-heat-recovery heat exchanger 10 and the air-cooled heat exchanger 13 are designed as respective amounts that permit separate processing of the overall amount of heat generated at the compressor body 3. Thus, when maximum heat recovery has been performed at the waste-heat-recovery heat exchanger 10, the temperature of the oil and the compressed air exiting from the waste-heat-recovery heat exchanger 10 is satisfactorily cooled, so that the fan motor 15 may be stopped in the air-cooled heat exchanger 13.

In case of the oil-cooled screw air compressor, the number of times of circulation of the oil filled in the compressor unit 20 (the number of times of circulation of the oil which has been discharged from the compressor body and then returns again to the compressor body) is typically as large as approximately 2 to 5 times/minutes, so that a change in the rotation speed of the cooling fan 14 results in a relatively sensitive change in the temperature of the discharged compressed air detected by the discharge temperature sensor 5. Therefore, by performing the inverter control that changes the rotation speed of the cooling fan 14 in accordance with the temperature of the discharge temperature sensor 5, it is possible to control the temperature of the compressed air discharged from the compressor at approximately the target discharge temperature (discharge temperature within a prescribed range). In this embodiment, since the temperature sensor (TA) 11 and the temperature sensor (TO) 12 are also provided, the temperature of the compressed air and the oil flowing to the air-cooled heat exchanger 13 are known, which permits regulation of the rotation speed of the cooling fan also in view of temperature information from these temperature sensors 11 and 12, thus making it possible to more quickly and accurately bring the temperature of the compressed air, which has been discharged from the compressor body, closer to the target temperature.

Second Embodiment

Figure 2:
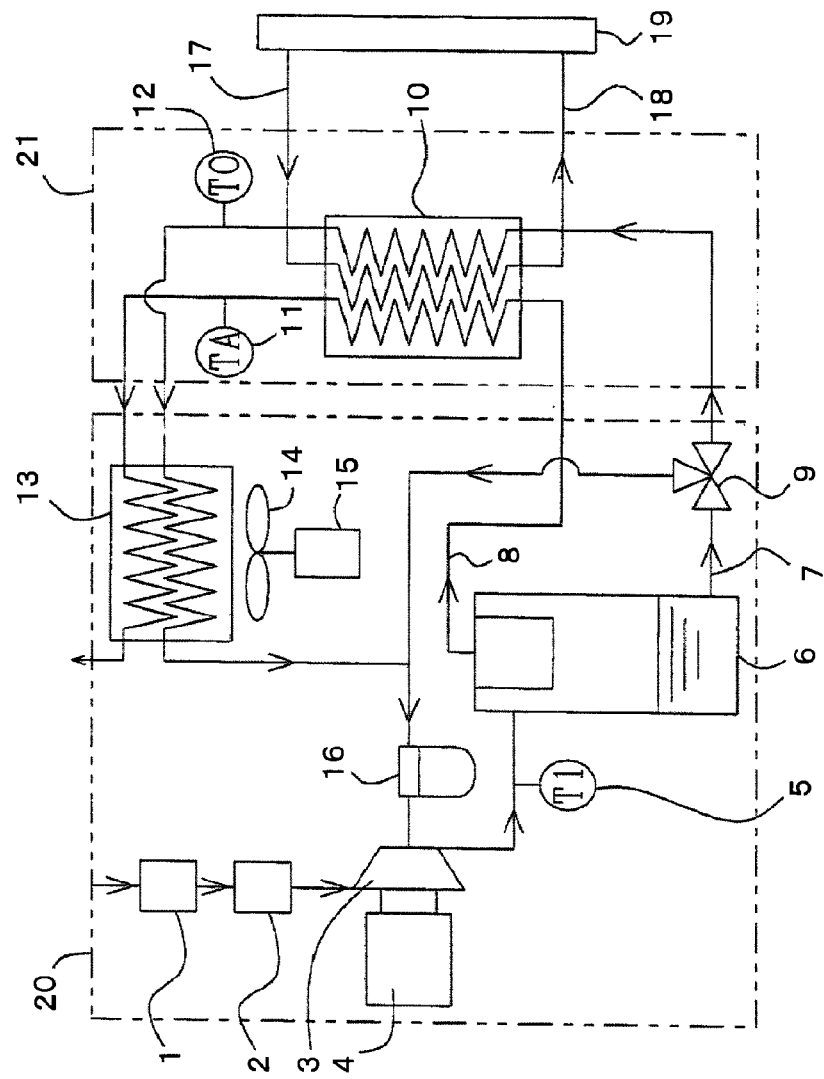
FIG. 2 is a schismatic diagram showing a second embodiment of the oil-cooled gas compressor of the invention.

FIG. 2 is a schismatic diagram showing the second embodiment of the oil-cooled gas compressor of the invention. In FIG. 2, portions marked with the same numerals denote identical or corresponding portions.

The first embodiment has been described above, referring to an example in which the compressor body 3, the oil separator (oil tank) 6, the waste-heat-recovery heat exchanger (water-cooled heat exchanger) 10, the air-cooled heat exchanger 13, etc. are installed in the compressor unit 20. However, in this second embodiment, in addition to the compressor unit 20, a waste-heat-recovery unit 21 is separately provided. In this waste-heat-recovery unit 21, a waste-heat-recovery heat exchanger (water-cooled heat exchanger) 10, a temperature sensor (TA) 11 detecting temperature of compressed air exiting from the waste-heat-recovery heat exchanger 10, a temperature sensor (TO) 12 detecting temperature of oil similarly exiting from the waste-heat-recovery heat exchanger 10, etc. are provided. On the other hand, in the compressor unit 20, a compressor body 3, an oil separator 6, an air-cooled heat exchanger 13; etc. are provided but unlike the first embodiment, a waste-heat-recovery heat exchanger 10 is not provided. The waste-heat-recovery unit 21 is connected to the compressor unit 20 with an oil pipe 7 and a gas pipe 8, and is connected to a waste-heat-recovery equipment 19 with circulation pipes (cooling water inlet pipe 17 and cooling water outlet pipe 18). Other configuration is the same as that of the first embodiment shown in FIG. 1.

In this embodiment, the compressor body 3, the oil separator 6, and the air-cooled heat exchanger 13 are stored in one housing to form the compressor unit 20, and the waste-heat-recovery heat exchanger 10 is stored in another housing to form the waste-heat-recovery unit 21. Then since the compressor unit 20 and the waste-heat-recovery unit 21 are connected together with the pipes, the same effect as is provided by the first embodiment is provided, and since the waste-heat-recovery unit 21 is a separate component, the compressor unit 20 can be downsized, which, for example, permits it to be carried easily. Further, provided is effect that, in a case where waste heat recovery is not performed by the waste-heat-recovery equipment 19, only the downsized compressor unit 20 can be installed for operation. Furthermore, since the compressor unit 20 and the waste-heat-recovery unit 21 can be installed separately from each other, provided is effect that the degree of freedom of installation increases.

Third Embodiment

Figure 3:
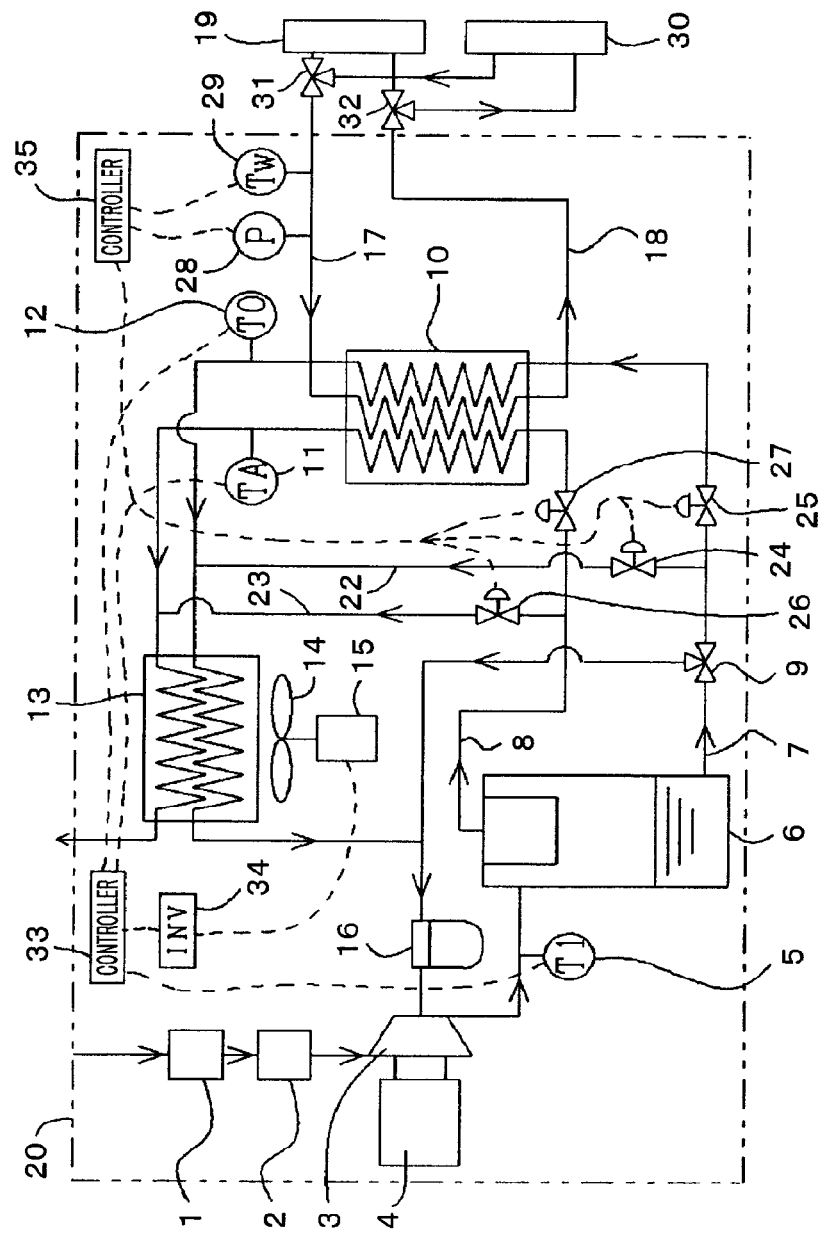
FIG. 3 is a schismatic diagram showing a third embodiment of the oil-cooled gas compressor of the invention.

FIG. 3 is a schismatic diagram showing the third embodiment of the oil-cooled gas compressor of the invention. In FIG. 3, portions marked with the same numerals as those of FIG. 1 denote identical or corresponding portions.

In the first and second embodiments, the oil and the compressed air exiting from the oil separator 6 flow through the oil pipe 7 and the gas pipe 8 and flows into the waste-heat-recovery heat exchanger 10, and then flows into the air-cooled heat exchanger 13. In this third embodiment, however, in order to permit the oil and the compressed air to flow directly to an air-cooled heat exchanger 13 by bypassing a waste-heat-recovery heat exchanger 10, an oil bypass pipe 22 and a gas bypass pipe 23 are provided. Moreover, in order to permit selection on whether oil and compressed air exiting from the oil separator 6 flow towards the waste-heat-recovery heat exchanger 10 or directly towards the air-cooled heat exchanger 13 (that is, the bypass pipes 22 and 23), an oil change-over valve and a gas change-over valve are provided. In this embodiment, the oil change-over valve is composed of two two-way valves (electromagnetic valves) 24 and 25, and the gas change-over valve is also composed of two two-way valves (electromagnetic valves) 26 and 27. That is, the oil bypass pipe 22 and an oil pipe 7 downstream of a bifurcation part of the oil bypass pipe are respectively provided with the two-way valves 24 and 25 to form the oil change-over valve, and the gas bypass pipe 23 and the oil pipe 7 downstream of the bifurcation part of the gas bypass pipe are respectively provided with the two-way valves 26 and 27 to form the gas change-over valve.

Illustrated in this embodiment is an example in which the oil change-over valve and the gas change-over valve are each formed by using the two two-way valves, but instead of the two two-way valves, one three-way valve may be used to form each of them.

Moreover, in this embodiment, provided at circulation pipes (cooling water inlet pipe 17 and cooling water outlet pipe 18) connecting together a waste-heat-recovery equipment 19 and the waste-heat-recovery heat exchanger 10 are: a running water detecting sensor (P) 28 for detecting whether or not there is running water or detecting a flow rate; and a temperature sensor (Tw) 29 for detecting temperature of cooling water flowing through the circulation pipe. In this embodiment, the running water detecting sensor 28 and the temperature sensor 29 are provided at the cooling water inlet pipe 17 of the circulation pipes but may be provided at the cooling water outlet pipe 18.

In this embodiment, the running water detecting sensor 28 is formed by a pressure sensor, and utilizing the fact that pressure is higher when there is at least a predetermined mount of running water than when there is no running water, whether or not there is running water is detected through detection of this pressure. Note that the running water detecting sensor 28 is not limited to the pressure sensor, but may be a displacement flow meter or an impeller type flow meter such as a gear meter which measures a flow rate of the cooling water flowing in the circulation pipe, and any type which can check the flow is applicable.

For the temperature sensor 29, the cooling water exiting from the waste-heat-recovery equipment 19 can be detected in a case where the temperature sensor 29 is provided at the cooling water inlet pipe 17 rather than the cooling water outlet pipe 18, so that the temperature of the cooling water in the waste-heat-recovery equipment 19 can be known with higher accuracy.

Further, in this embodiment, not only one waste-heat-recovery equipment 19 is provided, but one waste-heat-recovery equipment 30 is further provided, and the cooling water of the waste-heat-recovery equipment 19 or the waste-heat-recovery equipment 30 can be selectively supplied to the waste-heat-recovery heat exchanger 10 via the circulation pipe 17 or 18 by using a three-way valve 31 or 32.

Numeral 33 denotes a controller controlling the rotational frequency of a fan motor 15, and to this controller 33, discharge temperature information from a discharge temperature sensor 5 and compressed air and oil temperature information from temperature sensors 11 and 12 downstream of the waste-heat-recovery heat exchanger 10 are inputted. Based on these pieces of temperature information, in order to achieve small temperature difference between the discharge temperature of the compressed air detected by the discharge temperature sensor 5 and preset target discharge temperature, the controller 33 controls the fan motor 15 via an inverter 34, changes the rotational frequency of the cooling fan 14, and cools oil introduced into the compressor at appropriate temperature. This cooled oil is introduced into a compressor body 3 via an oil filter 16.

Note that in the first and second embodiments, the controller 33 and the inverter 34 described in the third embodiment are not illustrated, but a controller 33 and an inverter 34 as shown in FIG. 3 are similarly provided in the first and second embodiments.

Numeral 35 denotes a controller for controlling the oil change-over valves 24 and 25 and the gas change-over valves 26 and 27, and to this controller 35, running water information from the running water detecting sensor 28 and temperature information from the temperature sensor 29 are inputted.

In the first and second embodiments, even when the cooling water from the waste-heat-recovery equipment 19 is not supplied to the waste-heat-recovery heat exchanger 10 (the circulating water between the waste-heat-recovery equipment 19 and the waste-heat-recovery heat exchanger 10 stops), the high-temperature oil and compressed air from the oil separator 6 flow to the waste-heat-recovery heat exchanger 10 via the oil pipe 7 and the gas pipe 8. Thus, the water (cooling water) remaining in a path through which the cooling water flows in the waste-heat-recovery heat exchanger 10 is heated by the high-temperature oil and compressed air to evaporate whereby salt concentration increases, and as a result of action of chloride ions, the waste-heat-recovery heat exchanger 10 is subjected to local corrosive action, resulting in possibility of punching and breakage.

On the contrary, in the third embodiment, since the running water detecting sensor 28 is provided at the circulation pipe (cooling water inlet pipe 17) in a compressor unit 20, whether or not there is circulation of the cooling water to the waste-heat-recovery heat exchanger 10 or whether or not a circulation amount is equal to or larger than a specified value can be judged by the controller 35. Then if it has been judged that there is no circulation or if the circulation amount is equal to or smaller than the specified value, the oil change-over valves (two-way valves) 24 and 25 and the gas change-over valves (two-way valves) 26 and 27 can be controlled by the controller 35 to flow the high-temperature oil and compressed air from the oil separator 6 to the air-cooled heat exchanger 13 via the oil bypass pipe 22 and the gas bypass pipe 23, respectively. Therefore, it becomes possible not to flow the high-temperature oil and compressed air to the waste-heat-recovery heat exchanger 10, thus permitting prevention of the waste-heat-recovery heat exchanger 10 from corrosion.

In this embodiment, the controller 35 performs automatic change-over control of the oil change-over valves 24 and 25 and the gas change-over valves 26 and 27, but the change-over of the change-over valves 24 and 25 and the gas change-over valves 26 and 27 may be manually performed in accordance with results of the detection by the running water detecting sensor 28.

Moreover, in this embodiment, the temperature sensor 29 is also provided at the cooling water inlet pipe 17 in the compressor unit 20, so that temperature (Tw) of cooling water circulating between the waste-heat-recovery equipment 19 or 30 and the waste-heat-recovery heat exchanger 10 can be measured. This provides the following effects.

Assume a case where the waste-heat-recovery equipment 19 is provided as a warm water storage tank and cooling water in this warm water storage tank is circulated through the waste-heat-recovery heat exchanger 10 by the circulation pipes 17 and 18, thereby causing temperature increases up to target temperature TW2 for the waste-heat-recovery equipment 19 to provide warm water. In this case, the temperature of the cooling water circulating through the circulation pipe can be detected by the temperature sensor (Tw) 29, thus making it possible for the controller 35 to judge whether or not the cooling water (warm water) in the warm water storage tank (waste-heat-recovery equipment 19) has reached the target temperature TW2. Therefore, upon judgment that the cooling water in the warm water storage tank has turned warm water at the target temperature TW2, the controller 35 changes over the oil change-over tanks 24 and 25 and the gas change-over valves 26 and 27 (the two-way valves 24 and 26 are opened and the two-way valves 25 and 27 are closed). As a result, the circulation of the high-temperature oil and compressed air to the waste-heat-recovery heat exchanger 10 can be stopped, which can therefore bring the temperature of the warm water in the warm water storage tank (waste-heat-recovery equipment 19) at the target temperature TW2.

Moreover, in a case where the temperature sensor 29 has detected that the temperature of the warm water in the warm water storage tank (waste-heat-recovery equipment 19) decreased and turned to temperature (TW2-$\alpha$) lower than the target temperature TW2 by predetermined temperature $\alpha$, the controller 35 changes over the oil change-over valves 24 and 25 and the gas change-over valves 26 and 27 (the two-way valves 24 and 26 are closed and the two-way valves 25 and 27 are opened). As a result, the high-temperature oil and compressed air to the waste-heat-recovery heat exchanger 10 can be circulated, making it possible to maintain the temperature of the warm water in the warm water storage tank within a target temperature range.

Further, in a case where a plurality of waste-heat-recovery equipments (waste-heat-recovery equipments 19 and 30) connected to the compressor unit 20 are provided, provision of the temperature sensor 29 in the compressor unit 20 makes it possible to control the three-way valves 31 and 32 on waste-heat-recovery equipment 19 and 30 sides based on the temperature information from the temperature sensor 29. That is, change-over control can be performed such that when the cooling water of the first waste-heat-recovery equipment 19 is circulated through the waste-heat-recovery heat exchanger 10 and when the temperature detected by the temperature sensor 29 reached the target temperature TW2, the cooling water of the second waste-heat-recovery equipment 30 is circulated through the waste-heat-recovery heat exchanger 10, which permits waste heat recovery by the plurality of waste-heat-recovery equipments. Note that the number of the waste-heat-recovery equipments is not limited to two, and it is also similarly possible to provide three or more equipments.

In the embodiments described above, the waste-heat-recovery heat exchanger 10 is preferably formed by a plate-type heat exchanger. Moreover, as the plate-type heat exchanger, the one that can perform heat exchange of three fluids including oil, compressed air, and cooling water with one plate-type heat exchanger is preferable, but two plate-type heat exchangers including a plate-type heat exchanger performing heat exchange between oil and cooling water and a plate-type heat exchanger performing heat exchange between compressed air and cooling water may be combined together to form the waste-heat-recovery heat exchanger 10.

Moreover, in the waste-heat-recovery heat exchanger 10 described above, heat is recovered from both the high-temperature oil and the high-temperature compressed air from the oil separator, but heat may be recovered only from the oil whose heat capacity is larger than that of the air.

Note that any waste-heat-recovery heat exchanger 10 is a water-cooled heat exchanger in each of the embodiments described above, but the waste-heat-recovery heat exchanger 10 is not limited to a water-cooled type but it can similarly be implemented as an air-cooled heat exchanger.

Moreover, illustrated as an example of the oil-cooled gas compressor of the invention is the oil-cooled screw air compressor, but the oil-cooled gas compressor is not limited to the screw compressor but another type of compressor such as, for example, a scroll compressor is similarly applicable.

Further, a medium compressed by the oil-cooled gas compressor is not limited to air, but a compressor that compresses other gas is also similarly applicable. Moreover, a driving source may be the one (for example, engine or turbine) other than a motor.

The above embodiments have been described, referring to an example in which the waste-heat-recovery heat exchanger 10 and the air-cooled heat exchanger 13 are formed separately from each other, but the two heat exchangers may be formed integrally.

As described above, in this embodiment, as a cooling system of the oil-cooled gas compressor, in addition to the air-cooled heat exchanger 13 as a main first cooling system, the waste-heat-recovery heat exchanger 10 as a second cooling system is provided, and cooling capability of the air-cooled heat exchanger 13 is regulated in accordance with load fluctuation of the waste-heat-recovery heat exchanger 10 or whether or not it is in use, so that a required amount of waste heat from the oil-cooled gas compressor can be recovered by the waste-heat-recovery heat exchanger 10 when necessary in accordance with the load on the waste-heat-recovery equipment 19. Moreover, it becomes possible to control compressor temperature fluctuations and the temperature fluctuations of the compressed air supplied to a user at small levels regardless of the load on the waste-heat-recovery equipment 19 and the amount of compressed air supplied to the user.

Therefore, according to this embodiment, heat can simultaneously be recovered from the oil heated by being used to cool the compressor and the compressed gas discharged from the compressor, thus permitting highly efficient waste heat recovery. Moreover, the temperature of the oil returned to the compressor for compressor cooling can be quickly changed by controlling the rotation speed of the cooling fan even when the load on the waste-heat-recovery equipment varies, which can therefore bring the temperature of the compressed gas discharged from the compressor closer to the target temperature. As a result, the compressor temperature fluctuations can be controlled at a small level, which can provide an oil-cooled gas compressor capable of suppressing temperature fluctuations of compressed gas supplied to a user and supplying compressed gas at stable temperature.

Moreover, as described in the third embodiment, the following effects can be provided by providing the oil bypass pipe 22, the gas bypass pipe 23, the oil change-over valves 24 and 25, and the gas change-over valves 26 and 27 and further providing the circulation pipes 17 or 18 with the running water detecting sensor 28 or the temperature sensor 29.

Since the running water detecting sensor 28 can detect that there is no circulation of cooling water to the waste-heat-recovery heat exchanger 10 or the circulation of the cooling water to the waste-heat-recovery heat exchanger 10 has reached the specified amount or below, controlling the oil change-over valves and the gas change-over valves permits flow of the oil and compressed air from the oil separator 6 to the air-cooled heat exchanger 13 via the oil bypass pipe and the gas bypass pipe and prevents this flow to the waste-heat-recovery heat exchanger. This consequently can prevent punching and breakage of the waste-heat-recovery heat exchanger resulting from corrosion.

Moreover, the temperature of the cooling water flowing through the circulation pipe can be detected by the temperature sensor 29, thereby permitting judgment that the temperature of the cooling water in the waste-heat-recovery equipment 19 has reached the target temperature or above or decreased to a level smaller than the target temperature by certain temperature, based on which the circulation of the oil and compressed air to the waste-heat-recovery heat exchanger 10 can be stopped/supplied by the oil change-over valves and the gas change-over valves, thus making it possible to bring the temperature of the cooling water in the waste-heat-recovery equipment to target temperature required for the supply to the user or maintain it within the target temperature range.

DESCRIPTION OF REFERENCE NUMERALS

1: Suction filter, 2: Suction throttle valve,
3: Compressor body, 4: Main motor,
5: Discharge temperature sensor,
6: Oil separator (Oil tank),
7: Oil pipe, 8: Gas pipe (Air pipe),
9: Temperature regulating valve,
10: Waste-heat-recovery heat exchanger (Water-cooled heat exchanger),
11: Temperature sensor (TA), 12: Temperature sensor (TO),
13: Air-cooled heat exchanger,
14: Cooling fan, 15: Fan motor, 16: Oil filter,
17, 18: Circulation pipe (17: Cooling water inlet pipe, 18: Cooling water outlet pipe),
19, 30: Waste-heat-recovery equipment,
20: Compressor unit, 21: Waste-heat-recovery unit,
22: Oil bypass pipe, 23: Gas bypass pipe,
24, 25: Oil change-over valve (24, 25: Two-way valve),
26, 27: Gas change-over valve (26, 27: Two-way valve),
28: Running water detecting sensor (P),
29: Temperature sensor (Tw),
31, 32: Three-way valve,
33, 35: Controller,
34: Inverter.

What is claimed is:

1. A gas compressor comprising:
   a compressor body;
   a gas pipe for sending, to a user, the compressed gas;
   an air-cooled heat exchanger for cooling the compressed gas flowing through said gas pipe;
   a cooling fan capable of controlling rotational frequency for sending cooling wind to said air-cooled heat exchanger;
   a waste-heat-recovery heat exchanger provided upstream of said air-cooled heat exchanger for recovering heat from the compressed gas flowing through said gas pipe;
   an oil separator separating out oil from the compressed gas discharged from said compressor body; and
   an oil pipe for returning, to said compressor, the oil separated by said oil separator; wherein
   the rotational frequency of said cooling fan is controlled in a manner such that temperature of the compressed gas discharged from said compressor body falls within a prescribed range;
   the gas pipe sends the compressed gas to a user from the oil separator;
   the air-cooled heat exchanger also cools the oil flowing through said oil pipe; and
   the waste-heat-recovery heat exchanger also recovers heat from the oil flowing through said oil pipe.

2. The gas compressor according to claim 1, further comprising:
   an oil bypass pipe for flowing the oil exiting from upstream of said waste-heat-recovery heat exchanger to said air-cooled heat exchanger without flowing the oil to said waste-heat-recovery heat exchanger; and
   an oil change-over valve changing over the oil from the oil separator between flow to said waste-heat-recovery heat exchanger and flow to said oil bypass pipe.

3. A gas compressor comprising:
   a compressor body;
   a gas pipe for sending, to a user, the compressed gas;
   an air-cooled heat exchanger for receiving the compressed gas flowing through said gas pipe and cooling the compressed gas flowing through said gas pipe;
   a cooling fan capable of controlling rotational frequency for sending cooling wind to said air-cooled heat exchanger; and
   a waste-heat-recovery heat exchanger provided upstream of said air-cooled heat exchanger for recovering heat from the compressed gas flowing through said gas pipe; wherein
   the rotational frequency of said cooling fan is controlled in a manner such that temperature of the compressed gas discharged from said compressor body falls within a prescribed range.

4. The gas compressor according to claim 3, further comprising:
   a gas bypass pipe for flowing the compressed gas exiting from upstream of said waste-heat-recovery heat exchanger to said air-cooled heat exchanger; and
   a gas change-over valve changing over the compressed gas in said gas pipe between flow to said waste-heat-recovery heat exchanger and flow to said gas bypass pipe.

5. The gas compressor according to claim 3, wherein
   said waste-heat-recovery heat exchanger is connected to a circulation pipe for guiding fluid from an external waste-heat-recovery equipment and returning the fluid subjected to heat exchange to said waste-heat-recovery equipment; and
   the circulation pipe includes a running water detecting sensor.

6. The gas compressor according to claim 5, further comprising:
   a controller controlling the oil change-over valve based on running water information detected by said running water detecting sensor.

7. The gas compressor according to claim 3, wherein
said waste-heat-recovery heat exchanger is connected to a circulation pipe for guiding fluid from an external waste-heat-recovery equipment and returning the fluid subjected to heat exchange to said waste-heat-recovery equipment; and
said circulation pipe includes a temperature sensor.

8. The gas compressor according to claim 7, further comprising:
a controller controlling said oil change-over valve based on temperature information from said temperature sensor provided at said circulation pipe.

9. The gas compressor according to claim 7, wherein
a plurality of said waste-heat-recovery equipment are parallelly connected to said circulation pipe, and are selectively connected based on the temperature information from said temperature sensor.

* * * * *